United States Patent [19]

Burkett

[11] 4,249,430
[45] Feb. 10, 1981

[54] ROLLER AND DISC TRANSMISSION

[76] Inventor: Joe E. Burkett, Burkett Route, Coleman, Tex. 76834

[21] Appl. No.: 971,722

[22] Filed: Dec. 21, 1978

[51] Int. Cl.³ .................. F16H 3/02; F16H 15/16; F16H 13/10

[52] U.S. Cl. .................. 74/745; 74/190.5; 74/193; 74/213; 74/796; 74/798

[58] Field of Search .............. 74/190.5, 191, 193, 74/198, 796, 745, 200, 201, 209, 213, 798

[56] References Cited

U.S. PATENT DOCUMENTS

| Re. 22,549 | 9/1944  | Plensler     | 172/36    |
|------------|---------|--------------|-----------|
| Re. 26,917 | 6/1970  | Dickenbrock  | 74/730    |
| 1,166,838  | 1/1916  | Klay         | 74/201    |
| 1,198,000  | 9/1916  | Beemer       | 74/193    |
| 1,978,439  | 10/1934 | Sharpe       | 74/190.5 X|
| 2,425,188  | 8/1947  | Honigman     | 74/200    |
| 2,660,073  | 11/1953 | Patin        | 74/691    |
| 2,697,359  | 12/1954 | Louis        | 74/193    |
| 2,929,273  | 3/1960  | Weber        | 74/796    |
| 3,293,947  | 12/1966 | Chery        | 74/198 X  |
| 3,430,504  | 3/1969  | Dickenbrock  | 74/200    |
| 3,828,618  | 8/1974  | Sharpe et al.| 74/200    |
| 4,069,005  | 11/1977 | Bost         | 74/745    |

FOREIGN PATENT DOCUMENTS

| 1018689 | 10/1957 | Fed. Rep. of Germany | 74/796 |
| 1966800 | 4/1974  | Fed. Rep. of Germany | 74/200 |
| 987478  | 8/1951  | France               | 74/745 |
| 1184605 | 7/1959  | France               | 74/191 |
| 79329   | 4/1932  | Sweden               | 74/798 |

Primary Examiner—Leslie Braun
Attorney, Agent, or Firm—Richards, Harris & Medlock

[57] ABSTRACT

A mechanical transmission (10) is disclosed which utilizes a plurality of sets of rollers (94–104) with associated rotating discs (74, 152, 170 and 196). The rollers (94–104) are ellipsoidally shaped with concentric rows of teeth thereon. The associated discs (74, 152,170 and 96) have concentric rows of holes aligned for receiving the roller teeth. The rollers (94–104) are caused to tilt about a center shaft (88) by a control link (216) to engage various of the rows of teeth on the rollers (94–104) with the associated discs (74, 152, 170 and 196). Tilting of the rollers (94–104) in differing directions to differing degrees produces varying input to output drive ratios.

10 Claims, 6 Drawing Figures

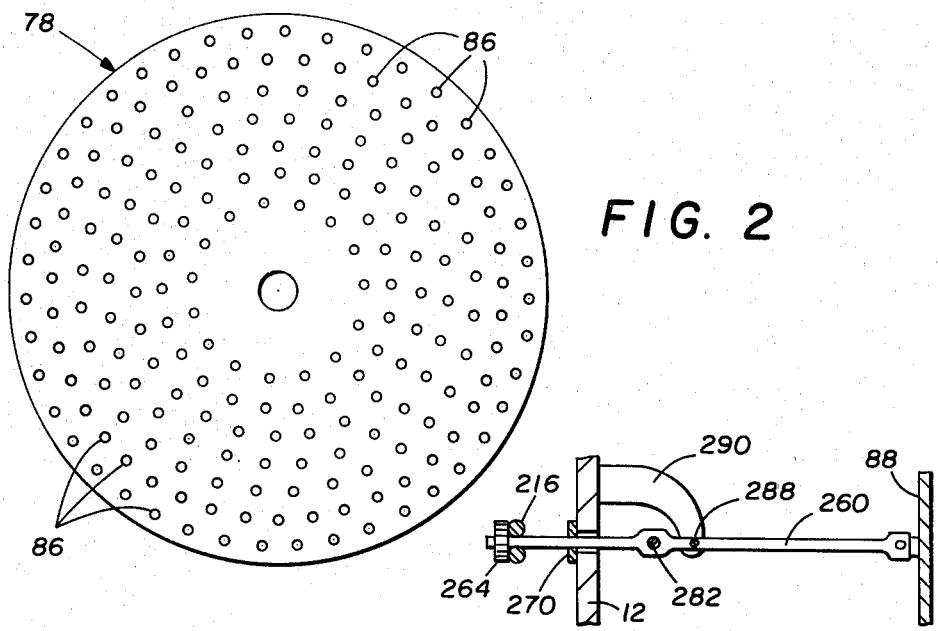
FIG. 2
FIG. 4
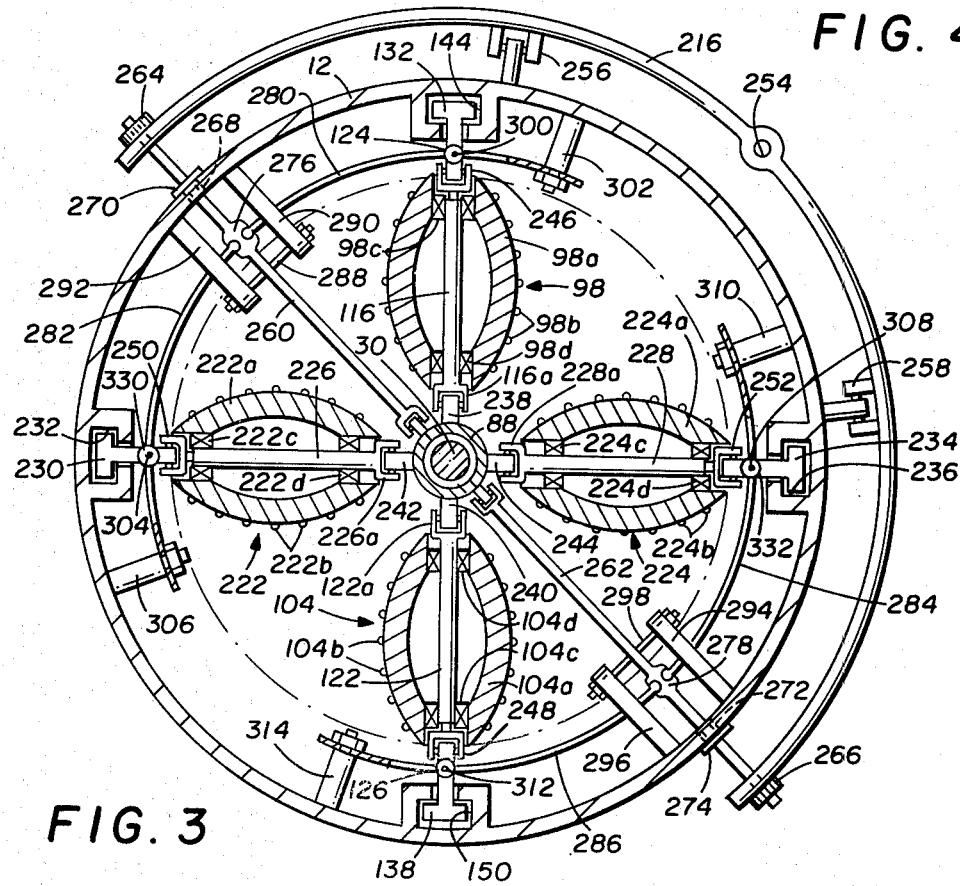
FIG. 3

ROLLER AND DISC TRANSMISSION

TECHNICAL FIELD

The present invention pertains to a variable ratio mechanical transmission and more particularly to a transmission having ellipsoidal rollers which engage contiguous discs to produce a plurality of gear drive ratios.

BACKGROUND ART

In many applications where a power source is utilized to drive a mechanical apparatus it is necessary to couple the power source through a variable ratio drive mechanism to the driven apparatus. A transmission is most predominantly used in this manner for the transfer of power from the motor of an automobile to the wheels. The features most commonly sought in a transmission of this type are numerous drive ratios to achieve the maximum efficiency from the power source, substantial power handling capability, reliability, low cost and simplicity in design and manufacture.

The most common transmission in use for vehicular applications utilizes a plurality of shaft mounted gears. The gears and shafts are transferred from one configuration to another by means of a control linkage to vary the drive ratio. A transmission of this type requires the manufacture of a large number of differing but precisely machined parts.

Another general type of transmission has been developed in which a tapered roller is driven by discs with the disc or rollers relatively movable to produce contact at different points along the roller and therefore produce varying drive ratios between the rollers and discs. Such a configuration is often used when it is desirable to have a continuously varying drive ratio in which case a smooth roller is utilized. A transmission of this type is shown in U.S. Pat. No. Re. 26,917 to Bickenbrock.

There exists a need for an improved mechanical transmission having a large number of drive ratios, easily manufactured parts, and capable of handling a wide range of power levels.

BRIEF DESCRIPTION OF THE DRAWINGS

The object and advantages of the present invention will be described in reference to the following Detailed Description taken in conjunction with the accompanying drawings in which:

FIG. 2 is an elevation view of a disc illustrated in FIG. 1, FIG. 3 is a sectional elevation view taken along lines 3—3 of the transmission shown in FIG. 1, FIG. 4 is an elevation view of the center shaft shift linkage as illustrated in FIG. 1.

DETAILED DESCRIPTION OF THE INVENTION

Figure 1:
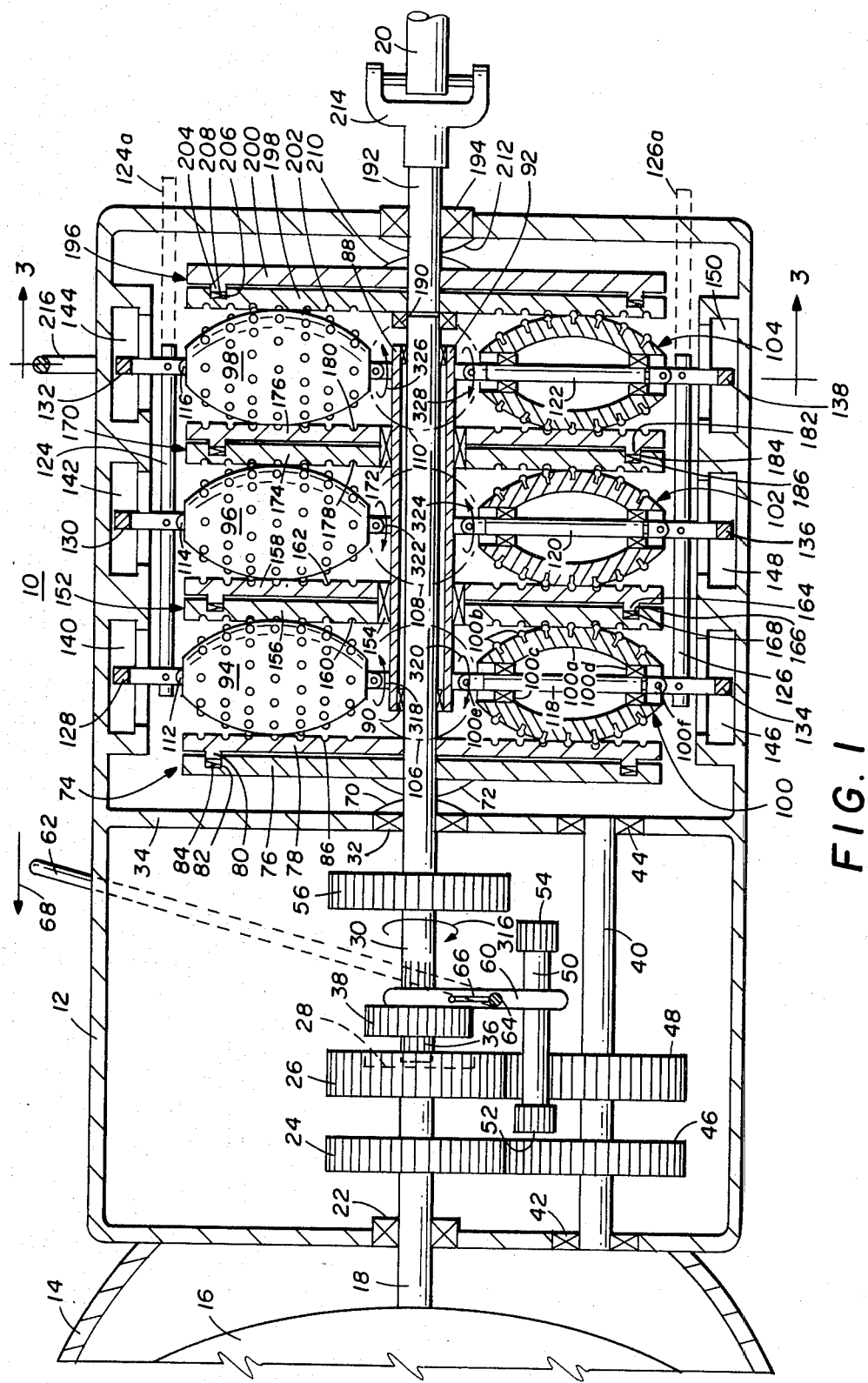
FIG. 1 is a sectional elevation view of the transmission of the present invention.

Referring to FIG. 1 the transmission of the present invention is shown generally as 10. The transmission 10 is enclosed within a housing 12 which is connected to a bell housing 14. A clutch 16 is located within the bell housing 14 and is connected to drive a shaft 18 which passes through the housing 12 into the transmission 10. The clutch 16 and shaft 18 transfer rotary energy from a motor (not shown) through the transmission 10 to a drive shaft 20 which is connected to the driven apparatus (not shown).

The shaft 18 is supported by a bearing 22 which is mounted in the housing 12. Within the housing 12 a gear 24 is fixed to the shaft 18. A forward gear 26 is also fixed to the shaft 18 further within the housing 12. Gear 26 includes a toothed indentation 28 for receipt of a gear to drive the forward gear 26.

A main shaft 30 is supported by a bearing 32 which is located within a support 34 connected to the housing 12. Shafts 18 and 30 are coaxial but are not connected together. On the end of shaft 30 facing forward gear 26 there are a plurality of splines 36 which extend longitudinally along shaft 30. Located on the splines of shaft 30 is a sliding gear 38 which is rotatably fixed to the shaft 30 by means of the splines 36 but can be moved longitudinally along shaft 30. Sliding gear 38 is adapted to mate within indentation 28 to lock gear 38 to forward gear 26.

A counter shaft 40 is located within housing 12 parallel to shafts 18 and 30 and supported by bearing 42 in housing 12 and bearing 44 in support 34. A set of counter rotating gears 46 and 48 are fixed to shaft 40 and engage respectively gears 24 and 26. Shaft 40 thus rotates in the opposite sense from that of shaft 18.

An idler shaft 50 has fixed on either end thereof reverse idler gears 52 and 54. Gear 52 is adapted to engage gear 48 while gear 54 is adapted to engage a reverse gear 56 also mounted on shaft 30. Idler shaft 50 is adapted to be translated longitudinally so as to have the gears thereon engage to gears 48 and 56 or to have the gears not engaged to any other of the gears.

A shifting fork 60 is operated by a shift lever 62 which rotates about a pivot 64. The pivot 64 is mounted in the housing 12 and is connected to an arm 66 that is joined to the shifting fork 60. The gear 38 is slidably positioned on the shaft 30 by the shifting fork 60 which simultaneously positions the reverse idler shaft 50. When the shift lever 62 is moved in the direction of the arrow 68, gear 38 is caused to enter into the indentation 28 and mesh with gear 26. This action positions the reverse idler shaft 50 such that the gears 52 and 54 are not engaged to any other gear. With gear 38 engaged to forward gear 26 the transmission is set for a forward drive. In the forward drive condition the shaft 18 is coupled to the shaft 30 so that both shafts rotate in the same direction.

When the shift lever 62 is moved in the direction opposite to the arrow 68, gear 38 is caused to be removed from the indentation 28 and be disengaged from the forward gear 26. As the shift lever is translated further the reverse idler shaft 50 is moved toward engagement of the gears thereon. But, before the reverse gears on the idler shaft 50 are engaged, the transmission is in the neutral state with their being no mechanical drive connection between the shafts 18 and 30. When the shift lever 62 is moved further in the direction opposite the arrow 68, the gears 52 and 54 respectively engage gears 48 and 56. Since the shaft 40 is rotating in the opposite direction from that of the shaft 18, the engagement of the reverse idler gears with the reverse gear 56 causes the shaft 30 to rotate in the direction opposite of the shaft 18. In this condition the transmission 10 is in the reverse state.

Still referring to FIG. 1, shaft 30 passes through spring washers 70 and 72 and is rotatably connected to a drive disc assembly 74. The assembly 74 comprises a pair of circular plates 76 and 78, both of which are rotatably connected to the shaft 30. Both of the plates 76 and 78 are mounted on splines on the shaft 30 to permit longitudinal translation thereon. The plate 78 includes a plurality of projections 80 which mate with an equal number of holes 82 in the plate 76. A plurality of springs 84 are located in the holes 82 and serve to force plates 76 and 78 apart. The projections and holes 80 and 82 serve to rotatably lock the plates 76 and 78 to form the disc assembly 74.

Plate 78 is illustrated in further detail in FIG. 2. As shown in FIG. 2 plate 78 has a plurality of holes 86 configured to form a plurality of concentric rings. Progressing from the inside toward the outside of the plate 78 the concentric rings have greater numbers of the holes 86.

Returning to FIG. 1, a supporting center shaft 88 is coaxially mounted on the main shaft 30 and is supported by bearings 90 and 92 therebetween. The main shaft 30 is thus mounted to rotate within the center shaft 88.

A plurality of ellipsoidal rollers 94-104 are each connected to the center shaft 88. The rollers 94-98 are shown in full elevation while the rollers 100-104 are illustrated in a sectional view. All of the rollers used in the transmission 10 however are identical. An additional six rollers are included within the transmission 10 and are disposed orthognally to those shown, and are positioned as shown by the dotted outlines 106-110. The rollers 94-104 are mounted on shafts 112-122 respectively.

The structure of the rollers will now be described in reference to roller 100. A shell 100a is in the shape of an ellipsoid and has disposed on the surface thereof a plurality of concentric rows of teeth 100b which are adapted to engage the holes 86 shown in FIG. 2. The shell 100a is supported and positioned on the shaft 118 by bearings 100c and 100d. Located at each end of the supporting shaft 118 is a clevis pivot forming one dimensional flexible joints 100e and 100f. Joints 100e and 100f permit the roller 100 to tilt with respect to the center shaft 88.

Shafts 112, 114 and 116 are joined by pin connections to a shift bar 124. Likewise shafts 118, 120 and 122 are connected to shift bar 126. The shift bars 124 and 126 include optional extensions 124a and 126a which extend through the housing 12.

Each of the shafts 112-122 has a respective T-shaped support 128-138. Each of the T-shaped supports is enclosed within a slot designated respectively as 140-150. The slots permit the T-shaped support members to move along the longitudinal axis of the transmission 10 but prohibit the respective shaft and roller from rotating about the center shaft 88. The support members 128-138 carry the rotational stress on the rollers.

The rollers 94 and 100 engage an idler disc assembly 152 which is supported by a bearing 154 that permits the disc assembly 152 to rotate about the center shaft 88. Disc assembly 152 comprises circular plates 156 and 158. The surfaces of each of these plates facing the rollers 94 and 96 is the same as that shown for plate 78 in FIG. 2. There are a plurality of holes 160 in the surface of plate 156, the holes being arranged in a configuration of concentric rings which mesh with the rings of teeth on the rollers 94 and 100. Plate 158 has likewise a configuration of holes 162 which mesh with the teeth on a rollers 96 and 102. The plate 158 includes a plurality of projections 164 which mate with holes 166 in plate 156. A spring 168 is included within each of the holes 166 to force the plates 156 and 158 apart into tight engagement with the rollers 94 and 96 as well as 100 and 102.

A second idler disc assembly 170 is supported on a bearing 172 which is in turn mounted on the nonrotating center shaft 88. The disc assembly 170 is identical to the disc assembly 152. The assembly 170 includes circular plates 174 and 176 having respectively therein a pattern of holes 178 and 180 mating with the teeth on rollers 96, 98, 102 and 104. Plate 176 has a projection 182 that mates with a hole 184 in plate 174. Spring 186 is included within the hole 184 to tension apart the plates 174 and 176.

Shaft 30 extends beyond center shaft 88 and is supported by bearing 190 whereat shaft 30 terminates. A shaft 192 is mounted to be coaxial and aligned with shaft 30. Shaft 192 passes through housing 12 and is supported by bearing 194.

The final drive disc assembly 196 includes circular plates 198 and 200 both of which are mounted on shaft 192, plates 198 and 200 being slidable on the shaft 192. The face of plate 198 includes a plurality of holes 202 arranged in a configuration of concentric rings similar to that shown for plate 78 in FIG. 2. The holes in plate 198 mate with and engage the teeth on rollers 98 and 104. Plate 200 includes a plurality of projections 204 which engage holes 206 in plate 198 with a spring 208 within each of the holes to tension apart plates 198 and 200.

Rollers 100, 102 and 104 engage disc assemblies 74, 152, 170 and 196 similarly as described above for rollers 94, 96 and 98.

A pair of spring washers 210 and 212 are located on shaft 192 separating plate 200 from bearing 194.

Drive shaft 192 is connected to a universal joint 214 which is in turn connected to drive shaft 20.

A shifting linkgage 216 is mounted on the housing 12 to provide a means for operating the shift bars 124 and 126 to tilt the rollers 94-104.

The transmission 10 is illustrated in cross sectional view through the lines 3—3 in FIG. 3. This view includes the rollers 98 and 104 together with rollers 222 and 224 the position of which is shown by dotted line 110 in FIG. 1. Roller 222 is supported on shaft 226 while roller 224 is supported on shaft 228. The shaft 226 is connected to a T-shaped support member 230 which operates within a slot 232. Likewise shaft 228 is connected to a T-shaped support member 234 which slides within a slot 236.

Each of the shafts 116, 122, 226 and 228 has on its interior end a clovis extension designated respectively as 116a, 122a, 226a and 228a. The clovis extensions are respectively connected by pins to studs 238-244 which are rigidly connected to the center shaft 88.

The outer end of each of the shafts 116, 122, 226 and 228 are internally threaded to receive respectively clovis joint sections 246-252. These clovis joint connections are in turn respectively connected to the T-shaped support members 132, 138, 230 and 234. The joint connectors are threaded to the shafts to permit proper alignment and tensioning of the shafts to the T-shaped members.

The shift linkage 216 includes a threaded hole 254 for receiving additional linkage connected to the operator controls (not shown). Shift linkage 216 is supported by swivel supports 256 and 258 which are connected to the outside of the housing 12. Movement of a control rod connected at the hole 254 causes the linkage 216 to pivot about the supports 256 and 258.

Shift arms 260 and 262 are connected at their outer ends to shift linkage 216. Shift arm 260 is connected by a threaded connector 264 which maintains the shift arm 260 within a slot in the shift linkage 216. Likewise a connector 266 joins shift arm 262 to the shift linkage 216 through a slot therein. Shift arm 260 passes through a hole 268 in housing 12, the hole being covered by a plate 270. In a similar manner shift arm 262 is connected through a hole 272 which is covered by a plate 274. Plates 270 and 274 maintain the oil-tight integrity of housing 12.

Arms 260 and 262 have respectively ball joint connections 276 and 278. Shift arms 280 and 282 are connected to ball joint 276 while shift arms 284 and 286 are connected to ball joint 278.

The shift arm 260 is supported by a pivot pin 288 which is in turn connected to supports 290 and 292. The structure comprising supports 290 and 292 together with arm 260 is illustrated in further detail in FIG. 4. The structure supporting arm 262 is similar to that shown in FIG. 4. Supports 294 and 296 are connected to the interior of housing 12 and have extended therebetween a pivot pin 298 passing through shift arm 262.

The shift arm 280 is connected by a pin 300 to the shift bar 124 and support member 132 and is joined to a pivot support 302. Arm 282 is similarly connected by a pin 304 to shift bar 230 and is connected to pivot about pivot support 306.

Arm 284 which is connected by ball joint 278 to shift arm 262 is also connected to member 234 by a pin 308 and to a pivot support 310. Also, arm 286 is joined by a pin 312 to support member 138 and is connected to rotate about a pivot support 314.

Operation of the preferred embodiment of the present invention is now described in reference to FIGS. 1-4. The shaft 18 is driven by a power source and the rotational energy carried by this shaft is transmitted through the various directional gears to produce rotation of the shaft 30 in either forward or reverse directions under control of the shift lever 62. Shaft 30 is rotatably connected to disc assembly 74 which engages rollers 94 and 100. Assuming shaft 30 is rotating in the direction indicated by arrow 316 the roller 94 will be caused to rotate as shown by arrow 318 while roller 100 rotates as indicated by arrow 320. The rotation as shown for rollers 94 and 100 will cause idler disc assembly 152 to rotate in the direction opposite arrow 316. Disc assembly 152 drives rollers 96 and 102 to rotate respectively as shown by arrows 322 and 324. Rotation of rollers 96 and 102 causes the second idler disc 170 to rotate in the direction indicated by arrow 316. Idler disc 170 drives rollers 98 and 104 causing them to rotate as indicated by arrows 326 and 328. Rollers 98 and 104 in turn drive disc assembly 196 in the direction opposed to arrow 316. Since disc assembly 196 is connected to shaft 192, shaft 192 is thus driven in the rotational sense opposite to that shown by arrow 316. In the condition as described above and as shown in FIG. 1 the transfer ratio of the transmission is 1.

The operation of the shift mechanism to cause the rollers to tilt and produce a differing drive ratio is described in reference to FIGS. 1 and 3. The shift link 216 is activated by a rod connected to the hole 254 to cause the shift link to rotate about the swivel supports 256 and 258. This in turn causes the outer ends of shift arms 260 and 262 to be translated longitudinally. Shift arm 260 pivots about pin 288 to cause longitudinal translation of center shaft 88 and movement of arms 280 and 282 respectively about pivot points 302 and 306. Arm 280 is connected by pin 300 to member 132 to cause the member 132 to slide within the slot 144. Likewise arm 282 is connected by pin 304 to cause member 230 to slide within slot 232. As can be seen by the arrangement of the pivot pins the movement of the arm 260 in one direction causes the center shaft 88 to translate in a first direction while the T-shaped members 132 and 230 translate in the opposite longitudinal direction. This action thus causes the rollers 98 and 222 to be tilted under the action of the shift link 216.

A similar operation occurs for the shift arm 262 which is pivoted about pin 298. The connection of the shift arm 262 through the ball joint 278 to arms 284 and 286 causes these arms to rotate respectively about points 310 and 314. Arm 284 is connected by a pin 308 to cause member 234 to translate longitudinally within slot 236. In a similar fashion arm 286 is connected by pin 312 to support 138 to cause it to translate within slot 150.

Arm 280 is connected to shift bar 124 to shift the similarly aligned rollers 94 and 96. Shift arm 286 is connected to shift bar 126 to cause rollers 100 and 102 to also tilt. In a similar manner arm 282 is connected to a shift bar 330 and arm 284 is connected to a shift bar 332. The bars 330, 332 operate the adjacent similarly aligned rollers within the transmission 10.

Figures 5, 6:
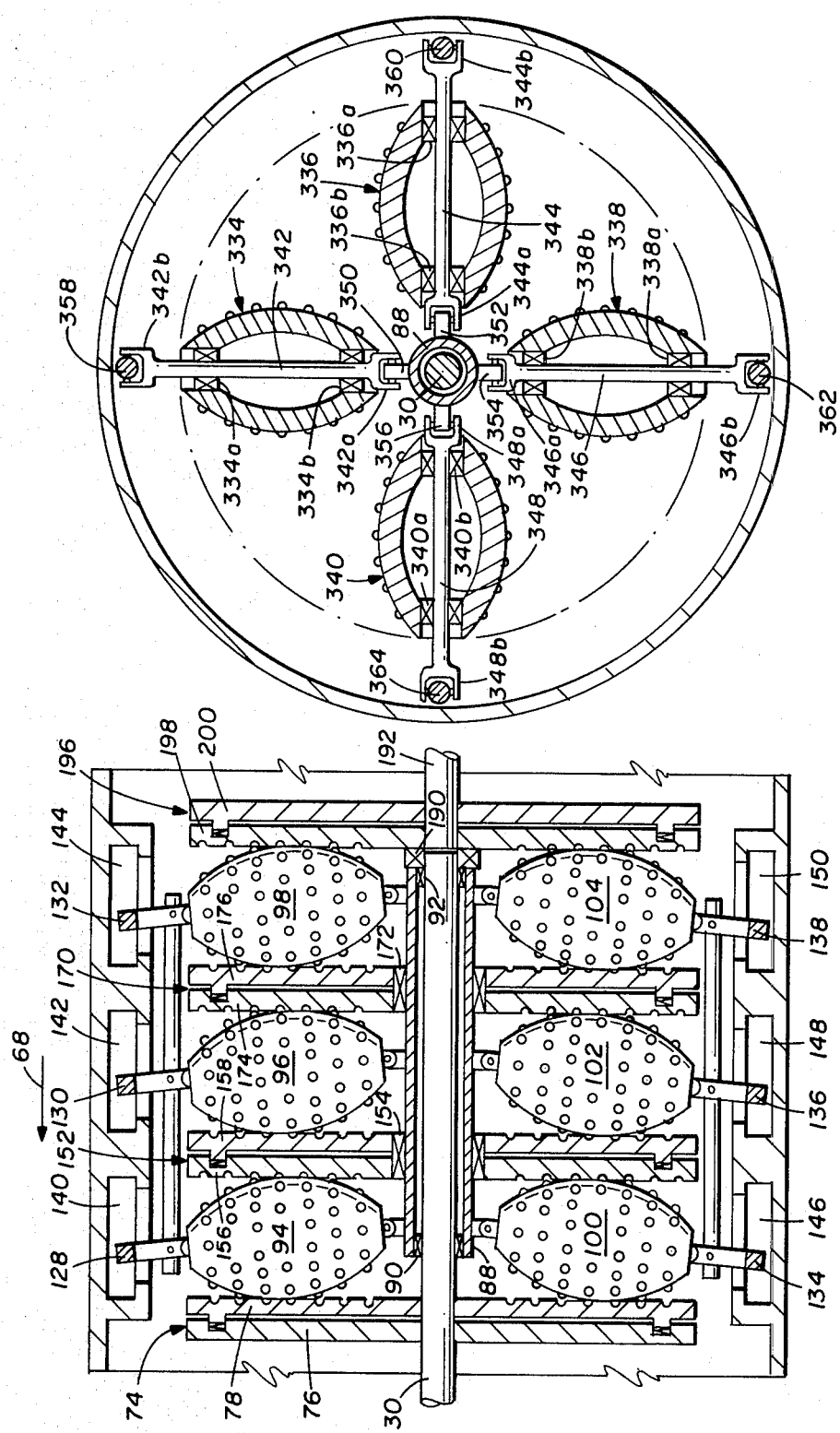
FIG. 5 is a sectional elevation view of the transmission shown in FIG. 1 with the rollers in the forward tilted position.
FIG. 6 is an alternative embodiment to the structure illustrated in FIG. 3.

When the shift link 216 is translated to cause the rollers within the transmission 10 to tilt, the drive ratio between shaft 30 and shaft 192 is changed dependent upon the degree and direction of tilt of the rollers. This is illustrated in FIG. 5. In the shift state shown in FIG. 5 disc assembly 74 has an outer ring of holes engaged to a ring of teeth on roller 94 toward the outer end thereof. Disc assembly 74 similarly engages roller 100 near its outer edge. The engagement of a greater number of holes on the disc plate 78 with a lesser number of teeth on the rollers 94 and 100 causes the rollers to spin at an accelerated rate in relation to that previously disclosed for a 1 to 1 drive ratio.

Still referring to FIG. 5 the rollers 94 and 100 are engaged at an inner row of teeth to an inner row of holes on disc assembly 152. The engagement of the rollers as shown causes disc assembly 152 to be rotated at a greater rate then that shown in the previous shift state. Rollers 96 and 102 engage plate 158 in the same manner as rollers 94 and 100 engage plate 78 thus causing greater rotational velocity of the rollers 96 and 102 over rollers 94 and 100.

The inner rings of teeth on rollers 96 and 102 engage an inner row of holes on plate 174 to cause disc assembly 170 to rotate at a greater rate than shown in the first example. In a continuous manner the plate 176 engages at an outer row of holes an outside ring of teeth on rollers 98 and 104.

The drive disc assembly plate 198 engages inner rings of teeth on rollers 98 and 104 causing greater rotational speed of assembly 196. Shaft 192 is rotationally connected to disc assembly 196. Thus, shaft 192 is rotated at a greater rate than shaft 30. The actual drive ratio between shafts 30 and 192 is determined by the degree of tilt of the rollers which determines the rows of teeth on the rollers which engage the associated discs.

In a like manner the rollers can be tilted in the direction opposite arrow 68 to cause a reduced drive ratio between input shaft 30 and output shaft 192. In this case the engagement of the inner and outer rows of teeth on the rollers are reversed with respect to the associated disc.

The center shaft 88 translates over the main shaft 30 in respect to the movement of the shift link 216 while at the same time the T-shaped support members are translated in the associated slots in the opposite direction. When the rollers are tilted in either direction the rollers occupy a greater longitudinal distance. The additional distance required is provided by the compensation of the various disc assemblies wherein the spring members between the plates comprising the disc are compressed. This action not only compensates for the movement of the rollers but maintains the disc and rollers in compressed contact. Additional longitudinal adjustment is provided by the spring washers 70, 72, 210 and 212 which drive the disc assemblies 74 and 196 together.

An alternative embodiment of the present invention is illustrated in FIG. 6. This is a roller arrangement which is substituted for the section illustrated in FIG. 3. This embodiment differs from that previously described in that the center shaft 88 is longitudinally fixed in relation to the main shaft 30 and the tilting of the rollers is accomplished entirely by movement of the outer ends of the roller shafts. Rollers 334–340 are supported respectively on shafts 342–348.

The rollers and shafts are identical and will be described in reference to roller 334. Bearings 334a and 334b support the roller 334 on the shaft 342. Shafts 342 has a one direction clovis connection 342a connected to a stud 350 on center shaft 88. The remaining shafts are respectively connected to studs 352, 354 and 356. The outer end of shaft 342 has a clovis connection 342b connected to a shift bar 358. In the same manner clovis connections 344b, 346b and 348b are connected to shift bars 360, 362 and 364. The shift bars 358 and 362 are positioned as shown in FIG. 1 for shift bars 124a and 126a including the extensions through the housing 12.

Operation of the embodiments shown in FIG. 5 is similar to that previously described with the exception that the tilting of the rollers is accomplished by longitudinal movement of the shift bars 358–364 while the interior ends of the rollers connected to the center shaft 88 are not moved.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

I claim:

1. A transmission which is connected between a power driven input shaft and an output shaft for producing selectable drive ratios therebetween, comprising in combination,
   (a) a housing having the input shaft extending therein,
   (b) a tubular support shaft having the input shaft passing therein,
   (c) a plurality of similar ellipsoidal rollers spaced about said support shaft, each roller rotatable about a roller shaft pivotally connected at one end to said support shaft, each roller having a plurality of circumferential rows of teeth,
   (d) a drive disc rotatably engaged to said input shaft, coaxial therewith, located within said housing, and contacting a set of said rollers, said drive disc having a plurality of concentric rows of holes in the surface thereof facing said rollers, each row of holes mating with one row of said teeth on said rollers whereby said rollers engage said drive disc with different ones of said rows of teeth when said rollers are tilted at predetermined angles relative to said support shaft,
   (e) a driven disc rotatably engaged to the drive shaft, coaxial therewith and located within said housing in contact with predetermined ones of said rollers, said driven disc having a plurality of concentric rows of holes in the surface thereof facing said predetermined rollers, each row of holes mating with one said row of teeth on said predetermined rollers, whereby said predetermined rollers engage said driven disc with different ones of said rows of teeth when said rollers are tilted at predetermined angles to said support shaft,
   (f) means for tilting said rollers relative to the longitudinal axis of said support shaft to produce a plurality of drive ratios between the input shaft and the output shaft by engaging selected rows of said teeth on said rollers with the corresponding rows of said holes on said discs, and
   (g) each of said discs comprises a first plate and a second plate rotatably engaged and tensioned apart by spring means with one of said plates having said row of holes therein.

2. A transmission according to claim 1 wherein said first plate has a plurality of studs normal thereto and said second plate has a plurality of openings therein for receiving said studs, each said opening having a spring therein for tensioning said stud outward and normal from said second plate.

3. A transmission which is connected between a power driven input shaft and an output shaft for producing selectable drive ratios therebetween, comprising in combination,
   (a) a housing having the input shaft extending therein,
   (b) a tubular support shaft having the input shaft passing therein, said support shaft longitudinally translatable relative to said housing,
   (c) a plurality of similar ellipsoidal rollers spaced about said support shaft, each roller rotatable about a roller shaft pivotally connected at a first end to said support shaft and pivotally connected at the second end thereof to a support member joined to said housing, each roller having a plurality of circumferential rows of teeth,
   (d) a drive disc rotatably engaged to said input shaft, coaxial therewith, located within said housing, and contacting a set of said rollers, said drive disc having a plurality of concentric rows of holes in the surface thereof facing said rollers, each row of holes mating with one row of said teeth on said rollers whereby said rollers engage said driven disc with different ones of said rows of teeth when said rollers are tilted at predetermined angles relative to said support shaft,
   (e) a driven disc rotatably engaged to the drive shaft, coaxial therewith and located within said housing in contact with predetermined ones of said rollers, said driven disc having a plurality of concentric rows of holes in the surface thereof facing said predetermined rollers, each row of holes mating with one said row of teeth on said predetermined rollers, whereby said predetermined rollers engage said driven disc with different ones of said rows of teeth when said rollers are tilted at predetermined angles to said support shaft, and (f) means for longitudinally translating said support shaft to cause said rollers to tilt relative to said support shaft to produce a plurality of drive ratios between the input shaft and the output shaft by engaging selected rows of said teeth on said rollers with the corresponding row of said holes on said discs, (g) each of said discs comprises a first plate and a second plate rotatably engaged and tensioned apart by spring means with one of said plates having said row of holes therein.

4. A transmission according to claim 3 wherein said first plate has a plurality of studs normal thereto and said second plate has a plurality of openings therein for receiving said studs, each said opening having a spring thereon for tensioning said stud outward and normal from said second plate.

5. A transmission which is connected between a power driven input shaft and an output shaft for producing selectable drive ratios therebetween, comprising in combination, (a) a housing having the input shaft extending therein, (b) a tubular support shaft having the input shaft passing therein, said support shaft longitudinally translatable relative to said housing, (c) a plurality of similar ellipsoidal rollers spaced about said support shaft, each roller rotatable about a coaxially disposed roller shaft pivotally connected at a first end thereof to said support shaft and slidably engaged at the second end thereof to a slot formed by structure connected to said housing, (d) a drive disc rotatably engaged to said input shaft, coaxial therewith, located within said housing, and contacting a set of said rollers, said drive disc having a plurality of concentric rows of holes in the surface thereof facing said rollers, each row of holes mating with one row of said teeth on said rollers whereby said rollers engage said driven disc with different ones of said rows of teeth when said rollers are tilted at predetermined angles relative to said support shaft, (e) a driven disc rotatably engaged to the drive shaft, coaxial therewith and located within said housing in contact with predetermined ones of said rollers, said driven disc having a plurality of concentric rows of holes in the surface thereof facing said predetermined rollers, each row of holes mating with one said row of teeth on said predetermined rollers, whereby said predetermined rollers engage said driven disc with different ones of said rows of teeth when said rollers are tilted at predetermined angles to said support shaft, and (f) means for simultaneously longitudinally translating said support shaft and longitudinally translating the ends of said roller shafts in said slots in a direction opposite the direction of said support shaft to cause said rollers to tilt relative to said support shaft to produce a plurality of drive ratios between the input shaft and the output shaft by engaging selected rows of said teeth on said rollers with the corresponding row of said holes on said discs, and (g) each of said discs comprises a first plate and a second plate rotatably engaged and tensioned apart by spring means with one of said plates having said row of holes therein.

6. A transmission according to claim 5 wherein said first plate has a plurality of studs normal thereto and said second plate has a plurality of openings therein for receiving said studs, each said opening having a spring therein for tensioning said stud outward and normal from said second plate.

7. A transmission which is connected between a power driven input shaft and an output shaft for producing selectable drive ratios therebetween, comprising in combination, (a) a housing having the input shaft extending therein, (b) a tubular support shaft having the input shaft passing therein, (c) a plurality of parallel sets of similar ellipsoidal rollers, the rollers of each set spaced about said support shaft, each roller having a plurality of circumferential rows of teeth, (d) a drive disc rotatably engaged to said input shaft, coaxial therewith, located within said housing, and contacting a first set of said rollers, said drive disc having a plurality of concentric rows of holes in the surface thereof facing said rollers, each row of holes mating with one row of said teeth on said rollers whereby said rollers engage said drive disc with different ones of said rows of teeth when said rollers are tilted at predetermined angles relative to said support shaft, (e) an intermediate disc freely rotating about said support shaft, coaxial therewith, located within said housing and contacting a set of said rollers on each surface thereof, said intermediate disc having a plurality of concentric rows of holes in each surface thereof facing said rollers, each row of holes mating with one row of said teeth on said rollers whereby said rollers engage said intermediate disc with different ones of said rows of teeth when said rollers are tilted at predetermined angles relative to said support shaft, (f) a driven disc rotatably engaged to the output shaft, coaxial therewith and located within said housing in contact with an end set of said rollers, said driven disc having a plurality of concentric rows of holes in the surface thereof facing said end set of rollers, each row of holes mating with one said row of teeth on said end set of rollers, whereby said end set of rollers engage said driven disc with different ones of said rows of teeth when said rollers are tilted at predetermined angles to said support shaft, (g) means for tilting said rollers relative to the longitudinal axis of said support shaft to produce a plurality of drive ratios between the input shaft and the output shaft by engaging selected rows of said teeth on said rollers with the corresponding rows of said holes on said discs, and (h) each of said drive and driven discs comprises a first plate and a second plate rotatably engaged and tensioned apart by spring means with one of said plates having said row of holes therein.

8. A transmission according to claim 7 wherein said first plate has a plurality of studs normal thereto and said second plate has a plurality of openings therein for receiving said studs, each said opening having a spring therein for tensioning said stud outward and normal from said second plate.

9. A transmission which is connected between a power driven input shaft and an output shaft for producing selectable drive ratios therebetween, comprising in combination,
  (a) a housing having the input shaft extending therein,
  (b) a tubular support shaft having the input shaft passing therein,
  (c) a plurality of parallel sets of similar ellipsoidal rollers, the rollers of each set spaced about said support shaft, each roller having a plurality of circumferential rows of teeth,
  (d) a drive disc rotatably engaged to said input shaft, coaxial therewith, located within said housing, and contacting a first set of said rollers, said drive disc having a plurality of concentric rows of holes in the surface thereof facing said rollers, each row of holes mating with one row of said teeth on said rollers whereby said rollers engage said drive disc with different ones of said rows of teeth when said rollers are tilted at predetermined angles relative to said support shaft,
  (e) an intermediate disc freely rotating about said support shaft, coaxial therewith, located within said housing and contacting a set of said rollers on each surface thereof, said intermediate disc having a plurality of concentric rows of holes in each surface thereof facing said rollers, each row of holes mating with one row of said teeth on said rollers whereby said rollers engage said intermediate disc with different ones of said rows of teeth when said rollers are tilted at predetermined angles relative to said support shaft,
  (f) a driven disc rotatably engaged to the output shaft, coaxial therewith and located within said housing in contact with an end set of said rollers, said driven disc having a plurality of concentric rows of holes in the surface thereof facing said end set of rollers, each row of holes mating with one said row of teeth on said end set of rollers, whereby said end set of rollers engage said driven disc with different ones of said rows of teeth when said rollers are tilted at predetermined angles to said support shaft,
  (g) means for tilting said rollers relative to the longitudinal axis of said support shaft to produce a plurality of drive ratios between the input shaft and the output shaft by engaging selected rows of said teeth on said rollers with the corresponding rows of said holes on said discs, and
  (h) said intermediate disc comprises a first plate and a second plate rotatably engaged and tensioned apart by spring means with each of said plates having said rows of holes therein.

10. A transmission according to claim 9 wherein said first plate has a plurality of studs normal thereto and said second plate has a plurality of openings therein for receiving said studs, each said opening having a spring therein for tensioning said stud outward and normal from said second plate.

* * * * *